(12) United States Patent
Cakmakci (10) Patent No.: US 11,550,095 B2
(45) Date of Patent: Jan. 10, 2023

(54) CURVED OPTICAL SEE-THROUGH THIN FREEFORM LIGHTGUIDE WITH LARGE FIELD OF VIEW IN EYEWEAR FORMFACTOR

(71) Applicant: GOOGLE LLC, Mountain View, CA (US)

(72) Inventor: Ozan Cakmakci, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 97 days.

(21) Appl. No.: 16/259,192

(22) Filed: Jan. 28, 2019

(65) Prior Publication Data

US 2020/0132919 A1    Apr. 30, 2020

Related U.S. Application Data

(60) Provisional application No. 62/751,008, filed on Oct. 26, 2018.

(51) Int. Cl.
*G02B 27/14* (2006.01)
*F21V 8/00* (2006.01)
(Continued)

(52) U.S. Cl.
CPC ....... *G02B 6/0076* (2013.01); *G02B 27/0172* (2013.01); *G06F 3/14* (2013.01); *G02B 2027/0178* (2013.01)

(58) Field of Classification Search
CPC ...... G02B 5/10; G02B 6/0055; G02B 6/0023; G02B 6/0028; G02B 6/0035;
(Continued)

(56) References Cited

U.S. PATENT DOCUMENTS 4,711,512 A * 12/1987 Upatnieks .......... G02B 27/4272
345/7
5,886,822 A * 3/1999 Spitzer ................. G02B 27/143
359/630
(Continued)

FOREIGN PATENT DOCUMENTS

CN    202758141 U    2/2013
CN    206741082 U    12/2014
(Continued)

OTHER PUBLICATIONS

International Search Report and Written Opinion dated Mar. 9, 2020 for International Application No. PCT/US2019/049663, 19 pages.
(Continued)

*Primary Examiner* — Mahidere S Sahle (57) ABSTRACT

An optical device includes a frame supporting a lightguide, a microdisplay, and a field lens positioned therebetween that directs light from the microdisplay into a top surface of the lightguide. Four optical surfaces of the lightguide include: a curved surface where light from the microdisplay enters a top of the lightguide, curved eye-side and world-side surfaces providing total internal reflection, and a combiner surface. The eye-side surface is used twice. Once in total internal reflection, and a second time as a refractive surface when light is reflected from the combiner surface and is thereby refracted out of the lightguide and directed towards a user's eye. The field lens has a curved first surface oriented toward the microdisplay and a curved second surface oriented toward the top of the lightguide. The combiner surface combines ambient light from a world-side of the lightguide with light from the microdisplay.

26 Claims, 5 Drawing Sheets

(51) Int. Cl.
*G02B 27/01* (2006.01)
*G06F 3/14* (2006.01)

(58) Field of Classification Search
CPC .............. G02B 25/001; G02B 27/0172; G02B 27/1066; G02B 27/01; G02B 27/0101; G02B 27/017; G02B 2027/0125; G02B 2027/013; G02B 2027/0178; G02B 2027/0112; G02B 2027/0123; G02B 2027/0132; G02B 2027/0194; G02B 2027/0196
USPC .......................... 345/8, 32; 359/34, 630, 631
See application file for complete search history.

(56) References Cited

U.S. PATENT DOCUMENTS

| | | | |
|---|---|---|---|
| 9,915,823 | B1 | 3/2018 | Kress et al. |
| 9,964,769 | B2 | 5/2018 | Martinez et al. |
| 10,139,634 | B2 | 11/2018 | Matsuki et al. |
| 10,310,297 | B2 | 6/2019 | Tessieres et al. |
| 10,437,066 | B2 | 10/2019 | Dobschal |
| 10,606,080 | B2 | 3/2020 | Hua et al. |
| 2002/0030639 | A1 | 3/2002 | Shimizu et al. |
| 2011/0194163 | A1 | 8/2011 | Shimizu et al. |
| 2012/0218481 | A1* | 8/2012 | Popovich ............ G02F 1/13342 349/11 |
| 2013/0141527 | A1* | 6/2013 | Shimizu ............. G02B 27/0103 348/40 |
| 2015/0062697 | A1 | 3/2015 | Komatsu et al. |
| 2016/0357016 | A1* | 12/2016 | Cakmakci .......... G02B 27/0172 |
| 2017/0010465 | A1* | 1/2017 | Martinez ............. G02B 27/017 |
| 2017/0123207 | A1* | 5/2017 | Kress ................. G02B 27/0172 |
| 2017/0293143 | A1 | 10/2017 | Martinez et al. |
| 2018/0284444 | A1 | 10/2018 | Matsuki et al. |
| 2019/0235253 | A1* | 8/2019 | Hua ..................... G02B 27/017 |
| 2019/0271844 | A1* | 9/2019 | Kress ................. G02B 27/0172 |
| 2019/0278088 | A1* | 9/2019 | Asaf .................. G02B 27/0172 |

FOREIGN PATENT DOCUMENTS

| | | |
|---|---|---|
| CN | 105874375 A | 8/2016 |
| CN | 206479716 U | 9/2017 |
| CN | 107272198 A | 10/2017 |
| CN | 10753322 A | 1/2018 |
| CN | 108139586 A | 6/2018 |
| CN | 108431666 A | 8/2018 |
| EP | 3270194 A1 | 1/2018 |
| JP | H10-153748 A | 6/1998 |
| JP | H10-221638 A | 8/1998 |
| JP | 2003050374 A | 2/2003 |
| JP | 2013200554 A | 10/2013 |
| JP | 2017003757 A | 1/2017 |
| WO | 2015079441 A1 | 6/2015 |
| WO | 2016147868 A1 | 9/2016 |
| WO | 2016195906 A1 | 12/2016 |

OTHER PUBLICATIONS

First Examination Report dated Aug. 11, 2021 for Indian Patent Application No. 202047051051, 7 pages.
International Preliminary Report on Patentability dated May 6, 2021 for PCT/US2019/049663, 14 pages.
First Office Action dated Dec. 23, 2021 for Chinese Application No. 201980038306.7, 22 pages.
Office Action dated Jul. 8, 2022 for Korean Patent Application No. 10-2020-7035475, 26 pages.
Notice of Grant dated Aug. 10, 2022 for Chinese Application No. 201980038306.7, 7 pages.
Office Action dated Jun. 7, 2022 for Japanese Patent Application No. 2021-503857, 13 pages.

* cited by examiner

|  | SURFACE 517 | SURFACE 545 |
|---|---|---|
| x^2 | -0.015 | 0.014 |
| y^2 | -0.015 | 0.013 |
| x^3 | 0.00011 | 0.00061 |
| x*y^2 | 7.3E-5 | -9.4E-5 |
| x^4 |  | 0.00043 |

SAG COEFFICIENTS TABLE

FIG. 8

|  | x | y | z | alpha | beta | gamma |
|---|---|---|---|---|---|---|
| SURFACE 515 | 0 | 0 | 0 | 0 | 0 | 0 |
| SURFACE 517 | 0 | 0 | 3.1 | 0 | 27 | 0 |
| SURFACE 513 | 0 | 0 | 5 | 0 | 0 | 0 |
| SURFACE 545 | 12.8 | 0 | 2 | 0 | 42.5 | 0 |
| SURFACE 509 | 11.5 | 0 | 0 | 0 | -153 | 0 |

COORDINATES TABLE

FIG. 9

CURVED OPTICAL SEE-THROUGH THIN FREEFORM LIGHTGUIDE WITH LARGE FIELD OF VIEW IN EYEWEAR FORMFACTOR

CROSS-REFERENCE TO RELATED APPLICATION

The present application claims priority to U.S. Provisional Patent Application No. 62/751,008, titled "CURVED OPTICAL SEE-THROUGH THIN FREEFORM LIGHTGUIDE WITH LARGE FIELD OF VIEW IN EYEWEAR FORMFACTOR" and filed on Oct. 26, 2018, the entirety of which is incorporated by reference herein.

BACKGROUND

The present disclosure relates generally to design, placement, and use of a see-through lightguide as part of a head-mountable display (HMD) device for creating augmented vision.

HMD devices usually incorporate a near-to-eye optical system to create a virtual image placed a distance in front of a user. Single eye and dual eye displays are referred to as monocular and binocular HMDs, respectively. Some HMD devices display only a computer-generated image (CGI), while other types of HMD devices are capable of superimposing a CGI over a real-world view. This latter type of HMD typically includes some form of see-through eyepiece and can serve as a hardware platform for implementing augmented reality (AR). A scene of the world when looking through see-through eyewear is augmented with an overlaying CGI. Such an arrangement is also referred to as a heads-up display (HUD).

HMDs have practical and leisure applications. However, many applications are limited due to cost, size, weight, thickness, field of view, and efficiency of optical systems used to implement existing HMD devices. A narrow field of view is particularly restrictive. Use of conventional components yield a CGI of only a few degrees width and a few degrees of height, resulting in a poor user experience. Previous HMD designs have attempted to address these issues by employing curved lightguides and have positioned a microdisplay in a temple region of a head wearable frame similar to a conventional pair of glasses. However, based on the particular geometry and physical constraints of arrangement of these designs, the lightguide restricts a light path to include at least two bounces or reflections on an eye-side of the lightguide and two reflections on a world-side of the lightguide thereby restricting a size of a resulting visible image. In addition, conventional constraints in positioning the components of HMDs lead to low field of view (FOV) displays that are on the order of 10 degrees diagonal within user sight.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Previous designs of lightguides placed a microdisplay at a temple position of a head-mountable display (HMD) device or apparatus or of a transparent heads up display (HUD) device or apparatus. This position can result in a lightguide length that is longer than desired. In particular, a microdisplay at the temple position can require a light path having two or more reflections on the eye-side surface of the lightguide and two or more reflections on the world-side surface of the lightguide before the light reaches a user's eyes. In order to hide the microdisplay in the temple position, the lightguide was required to be tilted at approximately 18 degrees so as to facilitate total internal reflection (TIR) within the lightguide. All of these constraints yielded a low field of view (FOV) display on the order of approximately ten degrees diagonal in a viewable image emitted from the microdisplay.

Embodiments described herein relate to see-through HMD devices, such as glasses, helmets, and windshields which enable optical merging of computer generated and real-world scenes to form a combined view. To improve over previous geometries, according to certain embodiments, a microdisplay ("display") is placed at a top of a curved lightguide as part of an HMD device to provide bilateral optic symmetry and extend a field of view from a few degrees to approximately 40 degrees horizontally and approximately 14 degrees vertically. The lightguide and microdisplay are positioned relative to one another to provide one reflection of total internal reflection on an eye-side, and one reflection on the world-side from surfaces of the lightguide. A projection from the microdisplay then outcouples with light from a world-side of the lightguide through a combiner region of the lightguide before reaching user eyes.

The placement of the microdisplay at the top of the lightguide is supported by various features of the lightguide such as having a curved eye-side surface and a curved world-side surface of the lightguide. According to certain embodiments, these curved surfaces are spherical, and each of these curved surfaces has a similar or approximately a same sized characteristic dimension (e.g., spherical dimension, radius) as each other. A first surface of the lightguide that first receives light from the microdisplay is curved, and, according to certain embodiments, is freeform, so as to correct for astigmatism, if any, with respect to the microdisplay. Another and final surface of the lightguide, providing a final reflection of light from the microdisplay toward the user eye, is also curved in a freeform manner. This final surface is referred to herein as a combiner or combiner surface. The image reflected therefrom is referred to as a light field. In other embodiments, the final surface of the lightguide is a rotationally symmetric aspherically-shaped surface, an anamorphic aspherically-shaped surface, a toroid-shaped surface, a Zernike polynomial-shaped surface, a radial basis function-shaped surface, an x-y polynomial-shaped surface, or a non-uniform rational b-spline-shaped surface.

A first lightguide is provided for a first (left) user eye, and a second lightguide is provided for a second (right) user eye. Each of the first and second lightguides is wrapped approximately five degrees from a view axis. According to some embodiments, a wrap angle is at least two degrees relative to the view axis. A frame maintains a surface of the lightguides at an approximately four degrees of tilt. An optical axis is oriented at approximately four degrees below a horizontal axis. An overall or combined pantoscopic tilt is thereby approximately eight degrees for the user eyes. A lightguide is approximately five mm or less in thickness. According to certain embodiments, a thickness is four mm or less in thickness. Spherical radii of curvature of spherical surfaces of the lightguide are designed such that the optical power thereof sums to zero (i.e., each light guide is a zero power shell). A see-through shell is maintained a small distance from the lightguide resulting in an aesthetically pleasing HMD device that provides a substantially enlarged image relative to conventional HMD devices and HMD image viewing systems.

Figure 1:
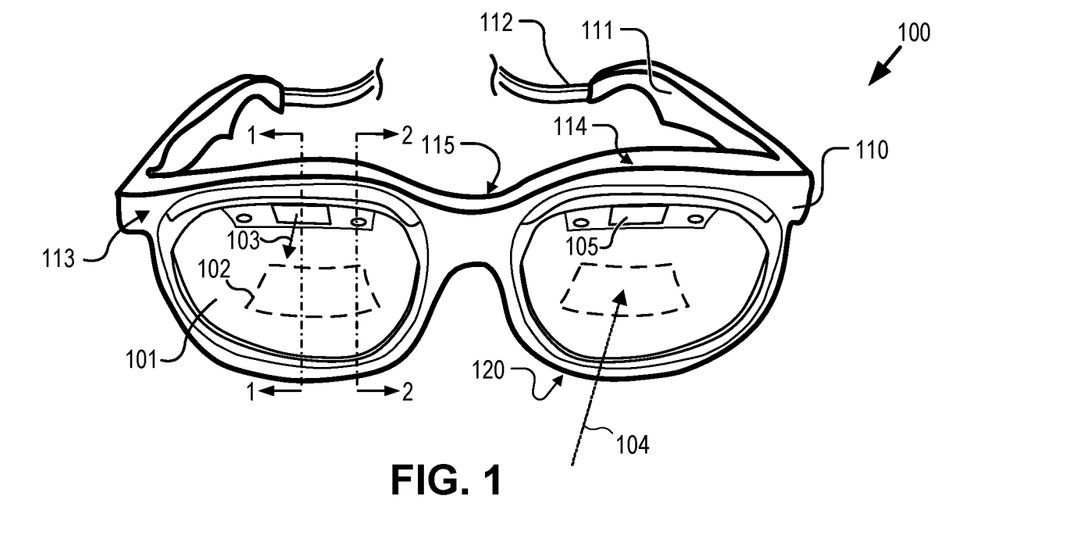
FIG. 1 and FIG. 2 illustrate perspective views of an eyewear device in accordance with some embodiments.

FIG. 1 illustrates a perspective view of an eyewear device 100 in accordance with some embodiments. The device 100 includes a pair of lightguides 101 mounted in a frame 110. The frame 110 secures the lightguides 101 between a top side 114 and a bottom side 120 thereof. The frame 110 is shaped into a form similar to an ordinary pair of eyeglasses. Generally, each lightguide 101 is transparent. Each lightguide 101 includes a dielectric mirror coating 102 that acts as a combiner that reflects light 103 from a respective microdisplay 105 and allows ambient light 104 from a world-side 113 to pass through to the eye-ward side 115 of the lightguide 101 and the dielectric mirror coating 102. Each microdisplay 105 is mounted at the top side 114 of the frame 110. The frame 110 includes two arms 111 that extend from a temple location of the frame 110 toward and over ears of a user (not illustrated). Each arm 111 houses a cord 112 for a respective microdisplay 105. Each microdisplay 105 receives power and a display signal from a computing device (not illustrated) through its respective cord 112.

Figure 2:
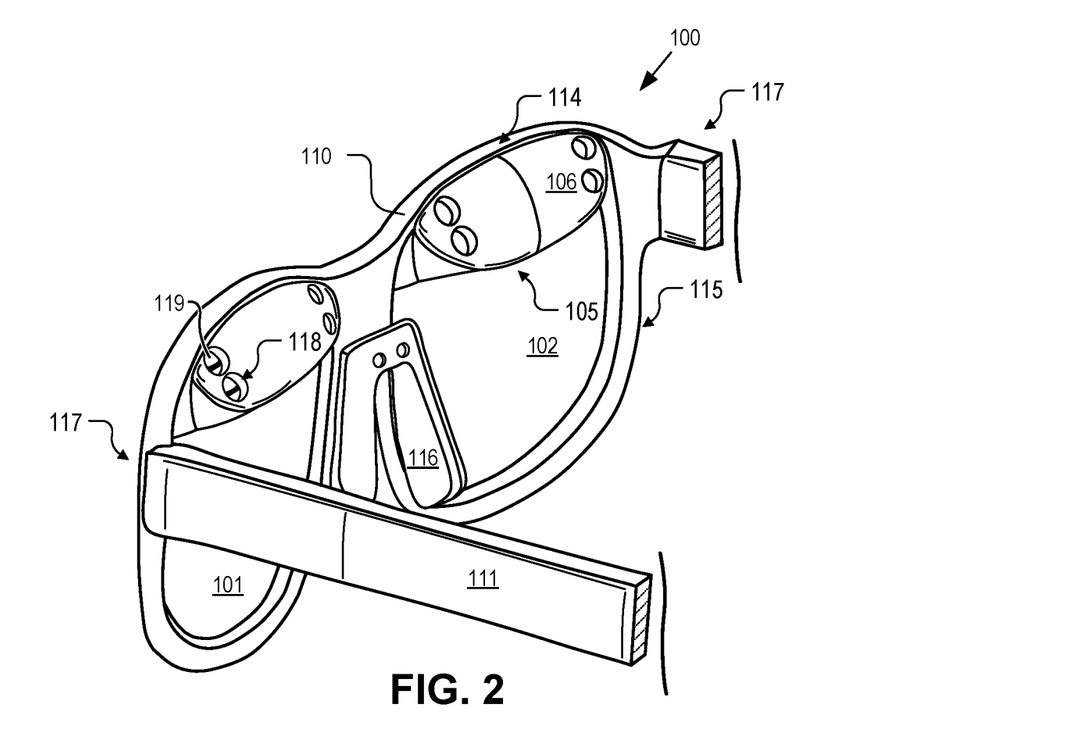

FIG. 2 illustrates another perspective view of the eyewear device 100 first shown in FIG. 1 in accordance with some embodiments. The frame 110 supports display housings 106 for the respective microdisplays 105. Each display housing 106 encloses a portion of its microdisplay 105. Display light 103 leaves each microdisplay 105 and enters a respective lightguide 101 from the top side 114 of the frame 110. According to some embodiments, the display light 103 is reflected inside and between the surfaces of the lightguide 101 one time at a first surface and one time at a second surface of the lightguide 101 by total internal reflection (TIR) and, subsequently, the display light 103 is reflected from the dielectric mirror coating 102. Light 103 originating from the microdisplay 105 then leaves the lightguide 101 toward the eye-ward side 115 of the frame 110 for observation by a user (not illustrated). An arm 111 extends from each of two temple locations 117 of the frame 110. Ambient light from the world-side 113 passes through the lightguides 101 to the eye-ward side 115 of the frame 110. A nose rest 116 is fastened to a central portion of the frame 110 such that the lightguides 101 are positioned in front of user eyes. Fasteners 118 inside respective fastener recesses 119 secure the display housings 106 and microdisplays 105 to the frame 110. Placement of the microdisplays 105 at the top side 114 of the frame 110 provides bilateral optic symmetry. Due at least in part to features of the surfaces of the lightguides 101 and a field lens or display lens positioned between the microdisplay 105 and the respective lightguides 101, display light 103 is magnified for the user. For example, the lightguide acts as a magnifier and outputs a 40 degree horizontal by 14 degree vertical field of view for a pupil diameter of approximately four mm. The lightguides 101 and microdisplays 105 are positioned relative to one another to provide one reflection of total internal reflection on an eye-side surface, and one reflection on the world-side surface of the lightguides 101. A projection from the microdisplay then outcouples with light from a world-side of the lightguide 101 through a combiner region of the lightguide 101 before reaching the eyes of the user. According to certain embodiments, the eye-side and world-side surfaces of the lightguide 101 are spherical in curvature. Each of these curved surfaces of each lightguide 101 has an approximately same sized characteristic dimension as each other. A first surface of the lightguide 101 that first receives light from the microdisplays 105 is curved, and, according to certain embodiments, is curved in a freeform manner. Having a freeform curvature corrects an astigmatism, if any, in a resultant light field from the microdisplay 105 as seen reflected from the dielectric mirror coating 102. According to some embodiments, a second or combiner surface of the lightguide 101 is curved in a freeform manner.

Figure 3:
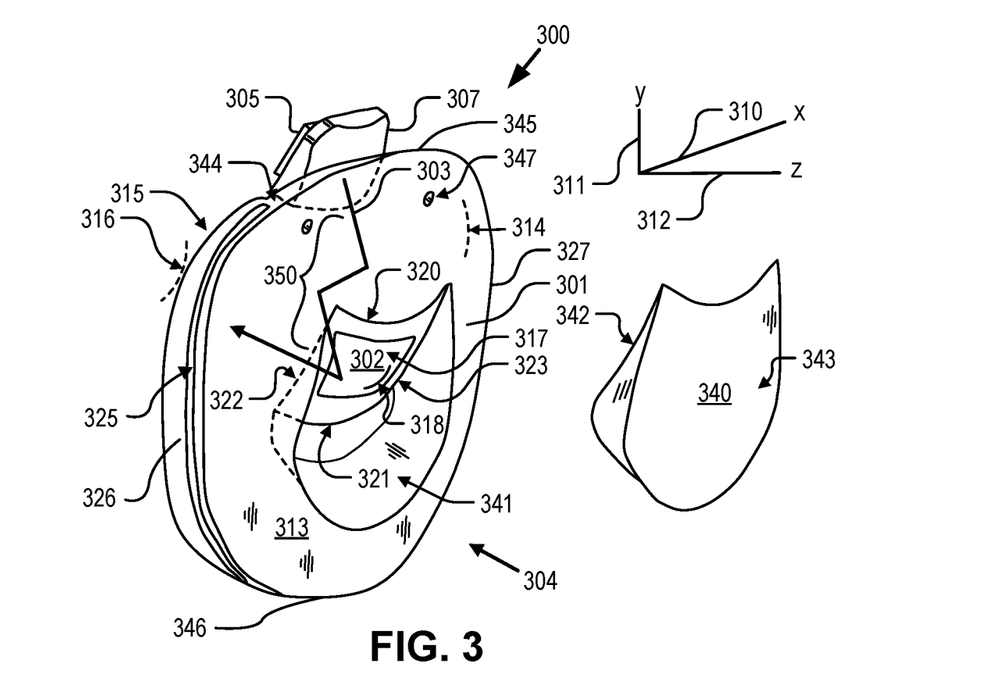
FIG. 3 illustrates an exploded perspective view of a lightguide in accordance with some embodiments.

FIG. 3 illustrates an exploded perspective view of a lightguide 301 first illustrated in FIG. 1. A set of components 300 of an eyewear device 100 include the lightguide 301 and a matching filler piece 340. The filler piece 340 is optional and is included with the lightguide 301 so as to make the eyewear device 100 appear as ordinary eyewear. Surfaces of the filler piece 340 are shaped to match surfaces of the lightguide 301 including surfaces of a recess 341 in the lightguide 301. For example, on an eye-ward side of the filler piece 340, a first matching surface 342 of the filler piece 340 is shaped to match a combiner curvature 318 of a combiner surface 317 of a combiner aperture 302 of the lightguide 301. To the extent that the filler piece 340 extends to an eye-ward side of the lightguide 301, another surface of the filler piece 340 is shaped to match an eye-side curvature 316 of an eye-side surface 315 of the lightguide 301. The combiner aperture 302 is found within boundaries of the combiner surface 317. The combiner surface 317 is defined by a top interface line 320, a bottom interface line 321, an outer interface line 322, and an inner interface line 323. Each of the lines 320-323 are found at the intersection of respective surfaces of the lightguide 301. On a world-side of the filler piece 340, a second matching surface 343 is shaped to match a world-side curvature 314 of a world-side surface 313 of the lightguide 301.

Display light 303 from a display 305 and ambient light 304 from the world-side of the lightguide 301 are combined in the combiner aperture 302. The display light 303 travels a light path 350 within the lightguide 301. The combiner aperture 302 is a portion of the combiner surface 317 that reflects the display light 303 toward the eye-ward side of the lightguide 301. Display light 303 generated by the display 305 is directed by way of a field lens 307 into a top surface 304 of the lightguide 301. The display light 303 reflects inside the lightguide 301 at least one time from each of the world-side surface 313 and the eye-side surface 315. Preferably, the display light 303 reflects one time from each of the surfaces 313, 315 before exiting on the eye-ward side of the lightguide 301. The shapes of the surfaces of each component of the set of components 300, including the surfaces of the lightguide 301 and the filler piece 340, include a dimensional component along one or more of a first (x) axis 310, a second (y) axis 311, and a third (z) axis 312. For example, the combiner surface 317 is curved from a perspective relative to the first axis 310 and curved from a perspective relative to the second axis 311 as further shown in other figures and further described herein.

The lightguide 301 includes an outer groove 325 in an outer edge 326 and an inner edge 327. The outer groove 325 extends from a top side 345 to a bottom side 346. The outer groove 325 is also formed in the top side 345 and the bottom side 346 of the lightguide 301. The outer groove 325 along the edges 326, 327 and sides 345, 346 mate to a ridge of a frame (not illustrated) so as to hold the lightguide 301 fixed in the frame as shown in FIG. 1. In FIG. 3, the lightguide 301 also includes one or more features such as one or more passages 347 into or through the lightguide 101 for receiving fasteners (not illustrated) to hold a display housing (not illustrated) and the display 305 at a fixed position and orientation at the top side 345.

Figure 4:
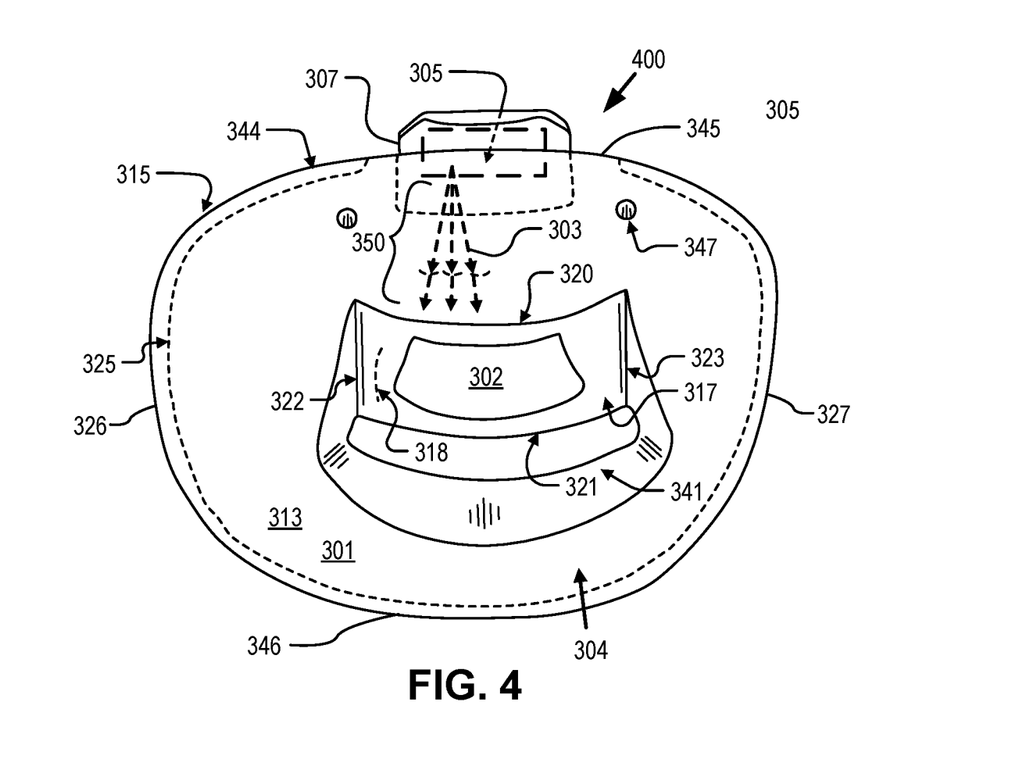
FIG. 4 illustrates a front view of the lightguide shown in FIG. 3 in accordance with some embodiments.

FIG. 4 illustrates a front view of the lightguide 301, the display 305, and the field lens 307 first shown in FIG. 3 in accordance with some embodiments. Through the recess 341 of the lightguide 301, the combiner surface 317 and the combiner curvature 318 are visible. The combiner aperture 302 is found within boundaries of the combiner surface 317. The combiner surface 317 is defined by the top interface line 320, the bottom interface line 321, the outer interface line 322, and the inner interface line 323. Each of the lines 320-323 are found at the intersection of respective surfaces of the lightguide 301.

Display light 303 generated by the display 305 is directed by way of the field lens 307 into the top surface 304 of the lightguide 301. Display light 303 from the display 305 and ambient light 304 from the world-side of the lightguide 301 are combined in the combiner aperture 302. The display light 303 travels the light path 350 within the lightguide 301. In certain embodiments, the display light 303 reflects inside the lightguide 301 one time from each of the world-side surface 313 and the eye-side surface 315 before exiting on the eye-ward side of the lightguide 301. In other embodiments, the display light 303 reflects inside the lightguide 301 more than one time from each of the world-side surface 313 and the eye-side surface 315 before exiting on the eye-ward side of the lightguide 301. The outer groove 325 is visible through the transparent lightguide 301 in the outer edge 326, the inner edge 327, and the bottom side 346. Passages 347 for receiving fasteners are visible near the top side 345 of the lightguide 301.

Figure 5:
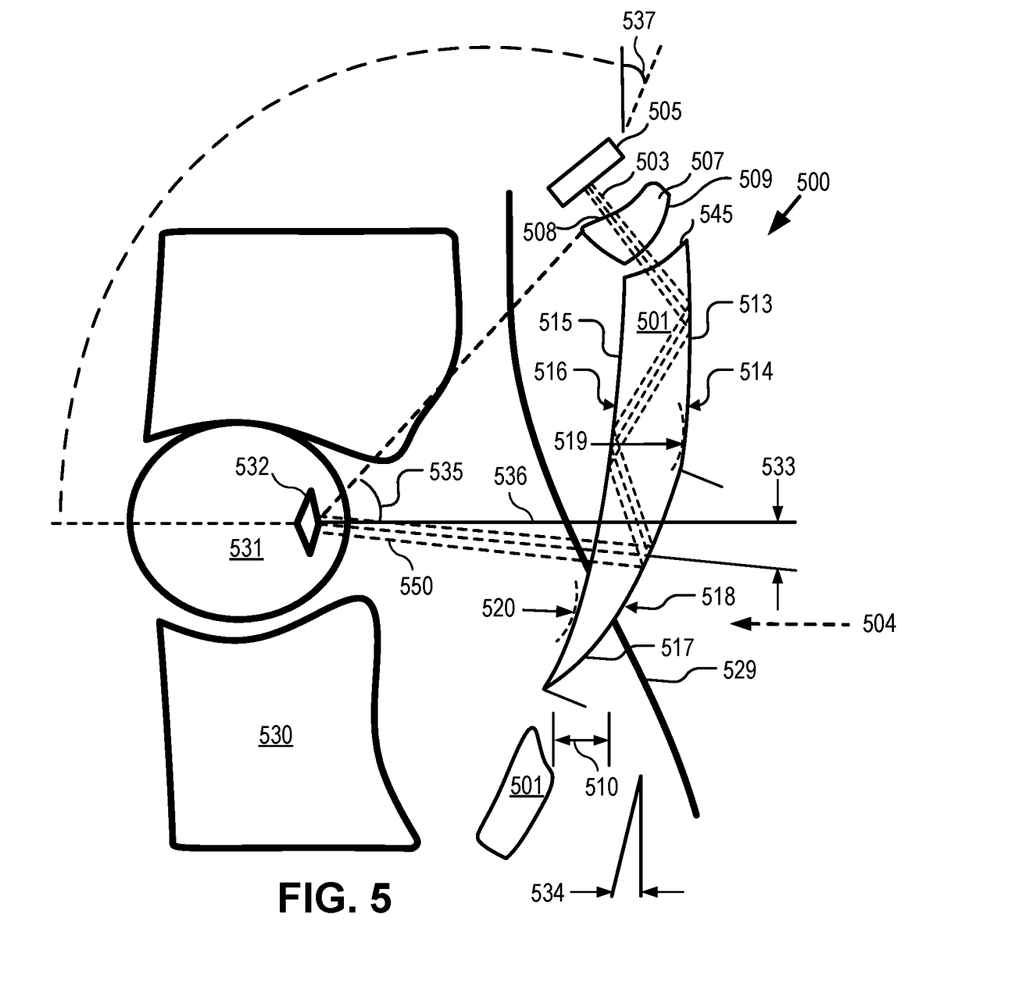
FIG. 5 illustrates a side cross-sectional view of a lightguide, a display, and a field lens along line 1-1 of FIG. 1 in accordance with some embodiments.

FIG. 5 illustrates a side cross-sectional view 500 along line 1-1 of FIG. 1 of a lightguide 501, a microdisplay 505, and a field lens 507 in accordance with some embodiments. The lightguide 501, the microdisplay 505, and the field lens 507 are arranged in a similar manner as the lightguide 301, the display 305, and the field lens 307 in FIG. 3. The microdisplay 505 generates display light 503. The display light 503 travels along a light path 550 toward an eye 531 and a pupil 532 of a user 530. A profile of a nose 529 in front of the eye 531 is visible. While one eye 531 is shown, it is understood that a similar arrangement and a similar set of components are provided for a second eye of the user 530 as shown in other figures. The lightguide 501, the microdisplay 505, and the field lens 507 are positioned in front of the eye 531 as shown such that a combiner surface 517 is in front of the eye 531 and the combiner surface 517 is at an intersection of the lightguide 501 and an optical axis 536 extending from a center of the pupil 532. In some embodiments, a center of a combiner area or resultant image area (not illustrated) within the combiner surface 517 provides a resultant image and is positioned at a first angle 533 below the optical axis 536. The first angle 533 is approximately four degrees. Ambient light 504 from a world-side of the lightguide 501 passes through the lightguide 501 and into the pupil 532 and the eye 531.

From the microdisplay 505, display light 503 first passes into a first surface 508 of the field lens 507. The first surface 508 is curved along a first axis, along a second axis (e.g., perpendicular to the page containing FIG. 5), or along both a first axis and a second axis. For example, the first surface 508 is spherical or freeform along one or more of the axes. According to some embodiments, the first surface 508 is positioned a third angle 535 of approximately 34 degrees above the optical axis 536. The display light 503 passes through a body of the field lens 507 and out a second surface 509. The second surface 509 is curved along a first axis, along a second axis, or along both a first axis and a second axis. For example, the second surface 509 is spherical or freeform along one or more of the axes.

Further, the field lens 507 is made of a first material and the lightguide 501 is made of a different second material. For example, the first material is a plastic material and the second material is a glass material, or a synthetic resin material such as Zeonex® E48R. According to some embodiments, a combination of the first material and the second material causes a color correction of the display light 503 by the time the display light 503 reaches the eye 531. While not illustrated, one or more of the components in the light path 550—the lightguide 501, the microdisplay 505, and the field lens 507—include one or more coatings for affecting a quality or a quantity of the display light 503 before reaching the eye 531.

The field lens 507 directs the display light 503 into a top surface 545 of the lightguide 501. The top surface 545 is curved such as being spherical or freeform in contour along a first axis, along a second axis, or along both a first axis and a second axis at a top position of the lightguide 501. The curvature of the top surface 545 corrects some or all of any astigmatism in the resulting CGI formed at the combiner surface 517. According to some embodiments, the resulting CGI, or field of view (FOV) thereof, is approximately 40 degrees horizontal and 14 degrees vertical relative to the eye 531 where the pupil has a nominal diameter or pupil size of 4 mm.

The lightguide 501 includes a world-side surface 513 having a world-side curvature 514 and an eye-side surface 515 having an eye-side curvature 516. The world-side surface 513 and the eye-side surface 515 are positioned relative to the top surface 545 so as to allow for total internal reflection of the display light 503 between the two surfaces 513, 515. Display light 503 enters the top surface 545 within approximately 24 degrees of a normal of the top surface 545. The display light 503 reflects from each of the two surfaces 513, 515 one time before reflecting from the combiner surface 517 toward the eye 531. The two surfaces 513, 515 are positioned within about five mm of each other. A lightguide thickness 510 is approximately five mm or less along a length from a top to a bottom of the lightguide 501. The lightguide thickness 510 as used herein is a distance between the world-side surface 513 and a closest point at the eye-side surface 515. According to some embodiments, along the world-side surface 513, the world-side curvature 514 includes a first spherical curvature 519 having a radius between 80-100 mm at the eye-ward side. Along the eye-side surface 515, the eye-side curvature 516 includes a second spherical curvature 520 having a radius between 80-100 mm at the eye-ward side. The first spherical curvature 519 is approximately 91.7 mm and the second spherical curvature 520 is approximately 90.0 mm.

The combiner surface 517 of the lightguide 501 is also positioned at a second angle 534, a pantoscopic tilt angle, relative to a vertical axis in front of the eye 531. According to some embodiments, the second angle 534 is measured from the vertical axis to a point within the CGI reflected from the combiner surface 517. For example, the second angle 534 is measured relative to a center of the CGI reflected from the combiner surface 517. As another example, the second angle 534 is measured relative to a center of the combiner surface 517. In some embodiments, the second angle 534 is approximately four degrees. A combined angle 537 including the first angle 533 and the second angle 534 relative to a vertical axis in front of the eye 531 is approximately eight degrees.

Figure 6:
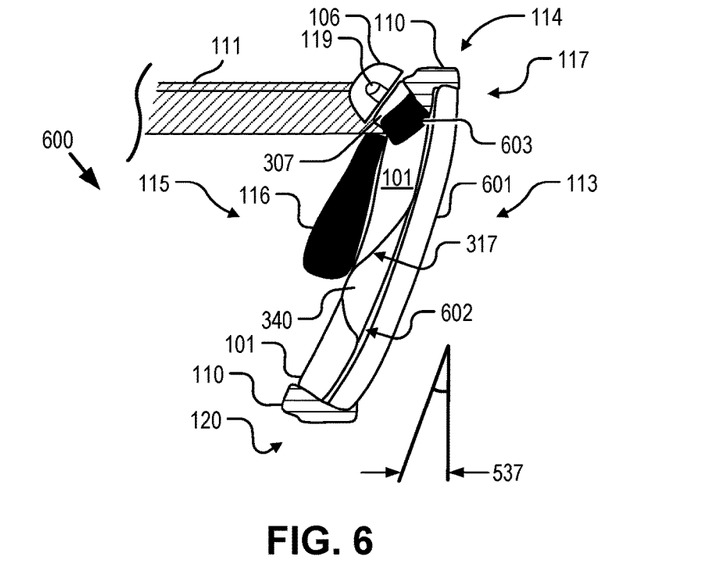
FIG. 6 illustrates a side cross-sectional view of the eyewear device along line 2-2 of FIG. 1 in accordance with some embodiments.

FIG. 6 illustrates a side cross-sectional view 600 of the eyewear device 100 along line 2-2 of FIG. 1 in accordance with some embodiments. The frame 110 includes the arm 111 mounted thereto at the temple location 117. The frame 110 is visible at the top side 114 and the bottom side 120 of the eyewear device 100. The display housing 106 is mounted in a fixed location and a fixed orientation as shown relative to the lightguide 101 at the top side 114 of the frame 110. The display housing is secured by a fastener such as a pin or screw (not illustrated) at or within the fastener recess 119 and secured into one or more of the frame 110 and the lightguide 101. The nose rest 116 is positioned on the frame 110 on the eye-ward side 115 of frame 110. The field lens 307 is positioned at the top side 114 of lightguide 101. A mask 603 shields light from entering or exiting a space between a display (not illustrated) and the lightguide 101 thereby improving a quality of light directed toward the lightguide 101 from the display and entering the top side 114 of the lightguide 101. The mask 603 also prevents light from the display and directly reaching a user eye on the eye-ward side 115 of the display without passing through the lightguide 101. According to some embodiments, the mask 603 extends around a perimeter of a top surface of the lightguide 101, a first surface of the lightguide 101, the display 305, the field lens 307, or a combination thereof.

The combiner surface 317 reflects light from the display at the top side 114 of the lightguide 101 toward the eye-ward side 115 of the frame 110. The combiner surface 317 also allows light from the world-side 113 to pass therethrough and combine with light from the display thereby creating a composite image for an application of AR. The filler piece 340 is positioned within or below the lightguide 101 and generally below the combiner surface 317. Light is reflected to a user eye (not illustrated) at the combined angle 537 based on the geometries of the lightguide 101, the frame 114, and the combiner surface 317. A shell 601 that is approximately 1.45 mm thick is positioned in front of the lightguide 101 and the filler piece 340 across an entire front of the eyewear device 100 from the top side 114 to the bottom side 120. A thickness of 1.45 mm is a typical sunglass lens thickness. The shell 601 is generally of a uniform thickness from the top side 114 to the bottom side 120. According to a first embodiment, a transparent model of a five mm thick synthetic resin shell 601 having world-side radius of approximately 91.7 mm and an eye-side radius of approximately 90 mm yields almost no aberrations at a line of sight and yields two arcminutes of blur at approximately 30 degrees. A position at 30 degrees is close to a maximum comfortable eye motion. At 45 degrees, the blur is 7.5 arcminutes. According to other embodiments, the shell 601 includes a material, a component, a coating or a film (not illustrated) giving the shell 601 a darkened or a sunglass-type aspect such as altering a characteristic of inbound light from the world-side 113 of the eyewear device 100. The frame 110 maintains an air gap 602 of approximately 0.15 mm between a front or world-side surface of the lightguide 101 and the shell 601.

Figure 7:
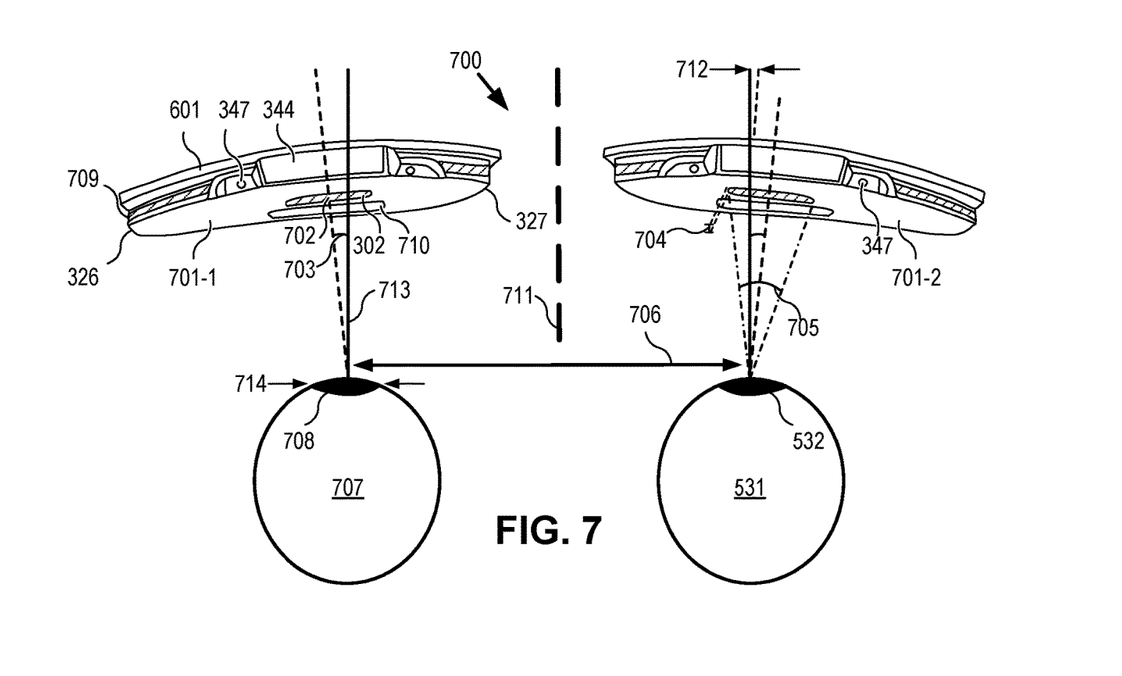
FIG. 7 illustrates an overhead view of the lightguides as if positioned in the frame as shown in FIGS. 1 and 2 in accordance with some embodiments.

FIG. 7 illustrates an overhead view 700 of lightguides 701-1, 701-2 as if positioned in the frame 110 as shown in FIGS. 1 and 2 in accordance with some embodiments. The lightguides 701-1, 701-2 are arranged in a binocular arrangement, one for each eye, which facilitates a proper view of 3D content. The first (right) lightguide 701-1 is positioned in front of a first (right) eye 531 and a first (right) pupil 532. A second (left) lightguide 701-2 is positioned in front of a second (left) eye 707 and a second (left) pupil 708. Each of the lightguides 701-1, 701-2 includes one or more grooves 709 in one or more edges thereof for interfacing with the frame (not illustrated). For example, a groove 709 is found in the outer edge 326 and the inner edge 327 of each of the lightguides 701-1, 701-2. Visible in an eye-side surface of each lightguide 701-1, 701-2 is an opening 710 corresponding to a back side of the recess 341 as in other figures including FIG. 3 and FIG. 4. A shell 601 is positioned on a world-side of each lightguide 701-1, 701-2. One or more passages 347 are formed in each of the lightguides 701-1, 701-2 to facilitate facilitating certain elements thereto. A top surface 344 for receiving display light from a display (not illustrated) is located in a central position at a top edge of each lightguide 701-1, 701-2.

The lightguides 701-1, 701-2 are positioned an equal distance from a central axis 711 as evidenced by a respective visual axis 713 for each of the eyes 531, 707. A center 702 of the combiner aperture 302 is formed in each lightguide 701-1, 701-2 and positioned a first wrap angle 703 with respect to the respective eye 531, 707. The first wrap angle 703 is greater than a second wrap angle 712 of each of the lightguides 701-1, 701-2 where the second wrap angle 712 is relative to a normal taken from a front surface of the respective lightguides 701-1, 701-2. For example, the first wrap angle 703 is approximately five degrees while the second wrap angle 712 is approximately 0.9 degrees. An interpupillary distance 706 of approximately 63 mm is provided between the visual axis of each eye 531, 707. Each of the combiner apertures 302 includes a vertical field size 704 of approximately 14 degrees and a horizontal field size 705 of approximately 40 degrees relative to the pupils 532, 708 of the first and second eyes 531, 707 for a pupil size 714 of approximately four mm.

Figure 8:
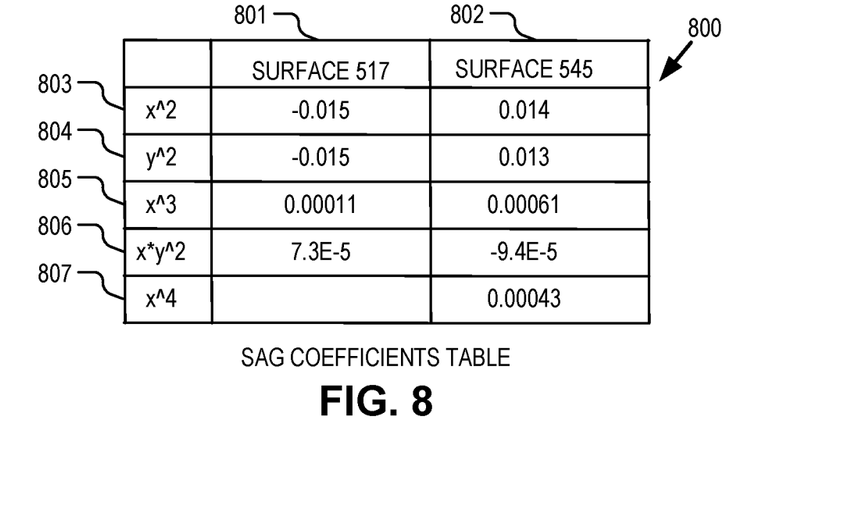
FIG. 8 illustrates a set of example coefficients characterizing shapes of two surfaces of a curved see-through lightguide in accordance with some embodiments.

FIG. 8 illustrates a set of example coefficients 800 characterizing surfaces of a demonstrative curved lightguide in accordance with some embodiments. The set of example coefficients 800 are consistent with the embodiment illustrated in FIG. 5. The first surface 801 corresponds to the combiner surface 517 and the second surface 802 corresponds to the top surface 545 of FIG. 5. The example coefficients 800 are consistent with coefficients and measurements known to those in the optics art for freeform lenses and which satisfy the following equation relative to an axis or center of a corresponding spherical lens:

$$sag(x, y) = \frac{(1/R)(x^2 + y^2)}{1 + \sqrt{1 - (1/R^2)(x^2 + y^2)}} + \sum C_{m,n} x^m y^n, \quad \text{(Equation 1)}$$

where m and n and x and y are integers, and where R is a length of a radius. For example, m=2 and n=0 corresponds to $C_{2,0}=x^2$. The first coefficient 803 corresponds to m=2 and n=0. For the first surface 801, $x^2$ is approximately −0.015 and for the second surface 802, $x^2$ is approximately 0.014. The second coefficient 804 corresponds to m=0 and n=2. The third coefficient 805 corresponds to m=3 and n=0. The fourth coefficient 806 corresponds to m=1 and n=2. The fifth coefficient 807 corresponds to m=4 and n=0. The values of the second through fifth coefficients 804-807 for the surfaces 801, 802 are as shown in FIG. 8 for a curved lightguide where a radius of curvature R of the second surface 509 of the field lens 507 is approximately 12 mm. The second surface 509 is the surface of the field lens 507 closest to the lightguide. A thickness between the eye-side surface 515 and the world-side surface 513 of the lightguide is approximately five mm. A radius of curvature for the eye-side surface 515 is approximately 90 mm and a radius of curvature for the world-side surface 513 is approximately 92 mm.

Figure 9:
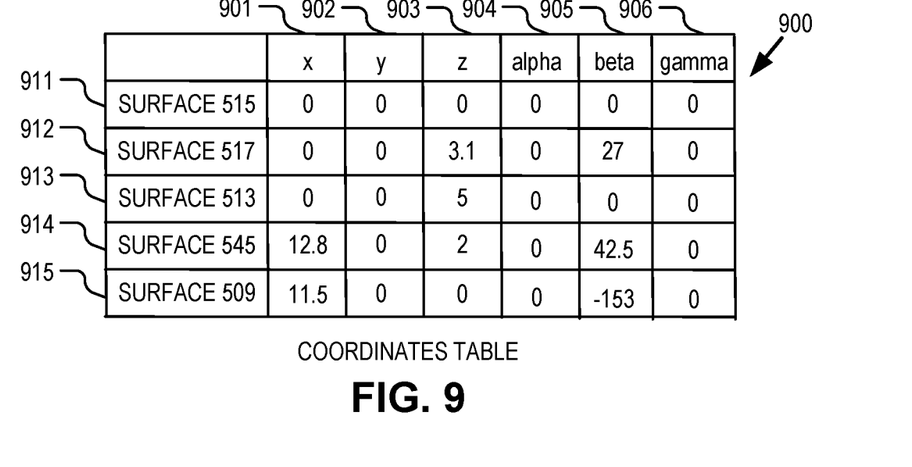
FIG. 9 illustrates a set of coordinate values characterizing surfaces of a curved see-through lightguide in accordance with some embodiments.

FIG. 9 illustrates a set of coordinate values 900 characterizing surfaces of a curved see-through lightguide in accordance with some embodiments. The set of coordinate values 900 are relative to an eye-side sphere vertex. The first three coordinates 901-903 are x, y, and z positions in millimeters (mm). The second three coordinates are tilts in degrees as known to those in the optics art. The first surface 911 corresponds to the eye-side surface 515. The second surface 912 corresponds to the world-side surface 517. The third surface 913 corresponds to the world-side surface 513. The fourth surface 914 corresponds to the top surface 545 of the lightguide 501. The fifth surface 915 corresponds to the second surface 509 of microdevice field lens 507 where the second surface 509 is the surface closest to the top surface 545 of the lightguide 501. According to certain embodiments, use of these coordinate values 900, in combination with other details provided herein, yields a field of view having a first size approximately 40 degrees horizontally and second size approximately 14 degrees vertically for a four mm diameter pupil.

The illustrated embodiments in the figures are not drawn to scale. Not all of the activities or elements described above in the general description are required. A portion of a specific activity or a device may not be required, and that one or more further activities may be performed, or elements included, in addition to those described. The concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitation is intended for the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical device comprising:
   a micro display configured to emit light of a computer generated image (CGI);
   a lightguide having a curved first surface at a top of the lightguide for receiving the CGI from the micro display and a curved second surface for reflecting the CGI through an eye-side third surface to a user eye;
   a combiner aperture disposed on a combiner surface, the combiner surface being defined by, and part of, the curved second surface of the lightguide and curved from a world-side fourth surface of the lightguide towards the eye-side third surface; and
   a head mountable frame supporting the micro display and the lightguide, wherein the micro display is positioned at a top of the head mountable frame, and wherein the first curved surface of the lightguide is at a top side of the lightguide.

2. The optical device of claim 1, further comprising:
   a field lens positioned between the micro display and the lightguide, the field lens comprising:
   a first surface oriented toward the micro display; and
   a second surface oriented toward the first curved surface of the lightguide.

3. The optical device of claim 2, wherein the field lens is formed of a glass material.

4. The optical device of claim 2, wherein the curved second surface of the lightguide is freeform.

5. The optical device of claim 2, wherein the second surface of the field lens is spherical.

6. The optical device of claim 2, wherein a surface of the field lens, the lightguide, or both the field lens and the lightguide is shaped to correct an astigmatism of the CGI of the light from the micro display in at least one of a first dimension and a second dimension as the light progresses from the micro display toward the curved second surface of the lightguide.

7. The optical device of claim 1, wherein the eye-side third surface of the lightguide is spherical having a spherical dimension between 80 mm and 100 mm of curvature.

8. The optical device of claim 1, wherein a fourth surface of the lightguide is spherical having a spherical dimension between 80 mm and 100 mm of curvature, and wherein a center of curvature of the fourth surface and a center of curvature of the eye-side third surface of the lightguide are approximately at a same position relative to the lightguide.

9. The optical device of claim 1, wherein the eye-side third surface of the lightguide is oriented with at least 2 degrees of pantoscopic tilt relative to the user eye.

10. The optical device of claim 9, wherein an optical axis is tilted at least 2 degrees below a horizontal axis relative to the user eye.

11. The optical device of claim 1, wherein the lightguide is oriented with at least 2 degrees of a wrap angle relative to an optical axis and the user eye.

12. The optical device of claim 1, wherein the eye-side third surface and a fourth surface of the optical device form a transparent heads up display (HUD), and the CGI and world view form a combined view to the user eye.

13. The optical device of claim 2, wherein the lightguide is made of a first material and the field lens is made of a second material different than the first material so as to provide a color correction to light of the CGI.

14. The optical device of claim 1, wherein the lightguide is formed of a synthetic resin material.

15. The optical device of claim 1, further comprising:
a filler piece having a first surface shaped to conform to the world-side fourth surface of the lightguide and shaped to fit into a recess in the lightguide, wherein the filler piece has a second surface shaped to conform to the curved second surface of the lightguide.

16. An apparatus comprising:
a display positioned at a top of a head wearable frame;
a display lens for receiving light from the display; and
a lightguide positioned near to the display lens to guide light from the display to an eye-ward direction, the lightguide including:
a transparent curved first surface on an eye-side of the lightguide;
a transparent curved second surface on a world-side of the lightguide;
a transparent third surface oriented toward the display lens for receiving display light, the display light reflecting inside the lightguide via total internal reflection;
a transparent curved fourth surface shaped to reflect light from the display to a user eye;
a recess extending from the transparent curved second surface into the lightguide towards the transparent curved first surface; and
a combiner aperture disposed within the recess and on a combiner surface defined by, and part of, the transparent curved fourth surface to combine the display light with ambient light entering from the world-side through the transparent curved second surface of the lightguide.

17. The apparatus of claim 16, wherein a first surface of the display lens is oriented toward the transparent third surface of the lightguide, and wherein the transparent curved first surface of the display lens is curved in a freeform manner along a first axis and the transparent curved first surface of the display lens is curved along a second axis perpendicular to the first axis thereby augmenting a resultant image area in at least one dimension at the transparent curved fourth surface of the lightguide.

18. The apparatus of claim 17, wherein the transparent curved fourth surface of the lightguide is curved in a freeform manner along a first axis and curved along a second axis perpendicular to the first axis thereby augmenting a resultant image area in at least one dimension at the transparent curved fourth surface of the lightguide.

19. The apparatus of claim 17, wherein a curvature of the transparent curved fourth surface of the lightguide is freeform along at least one axis, and wherein light from the display is reflected one time by internal reflection from each of the transparent curved first and second surfaces of the lightguide before reflecting from the transparent curved fourth surface and being transmitted through the transparent curved first surface on an eye-side of the lightguide toward a user eye.

20. The apparatus of claim 17, wherein a curvature of the transparent third surface of the lightguide is freeform along at least one axis thereby augmenting a resultant image area in at least one dimension at the transparent curved fourth surface of the lightguide.

21. The apparatus of claim 17, wherein a curvature of each of the transparent curved first and second surfaces of the lightguide is spherical along at least one axis.

22. The apparatus of claim 21, wherein a spherical dimension of each of the transparent curved first and second surfaces of the lightguide is between 80 mm and 100 mm of curvature.

23. The apparatus of claim 21, wherein a center of curvature of the transparent curved first surface and a center of curvature of the transparent curved second surface are approximately at a same position relative to the lightguide.

24. The apparatus of claim 16, wherein the transparent curved fourth surface of the lightguide is oriented with at least 2 degrees of pantoscopic tilt relative to a user eye.

25. The apparatus of claim 16, wherein a center of a resultant image reflected from the transparent curved fourth surface of the lightguide is tilted at least 2 degrees below a horizontal axis relative to a user eye on an eye-side of the lightguide.

26. The apparatus of claim 16, wherein the lightguide is oriented with at least 2 degrees of a wrap angle relative to an optical axis and a user eye on an eye-side of the lightguide.

* * * * *